United States Patent [19]
Ames et al.

[11] Patent Number: 6,063,477
[45] Date of Patent: May 16, 2000

[54] PLASTIC REPLACEMENT WINDOWS FOR AUTOMOBILES

[76] Inventors: Marc L. Ames, 539 Lyme Rock Rd., Bridgewater, N.J. 08807; Henry H. Magenheim, 1902 Ave. L, Brooklyn, N.Y. 11230

[21] Appl. No.: 07/931,206

[22] Filed: Aug. 17, 1992

[51] Int. Cl.[7] .............................. B32B 23/02; B32B 3/00
[52] U.S. Cl. .................. 428/192; 428/195; 428/332; 428/500
[58] Field of Search ................... 428/40, 41, 81, 428/516, 910, 480, 192, 195, 332, 500

[56] References Cited

U.S. PATENT DOCUMENTS

| | | | |
|---|---|---|---|
| 2,619,168 | 11/1952 | Leverence | 428/40 |
| 4,889,754 | 12/1989 | Vargas | 428/43 |
| 5,044,776 | 9/1991 | Schramer et al. | 428/41 |

OTHER PUBLICATIONS

Miles Kimball Co. Catalog, Dec. 1990, p. 58.

*Primary Examiner*—Paul Thibodeau
*Assistant Examiner*—Kevin R. Kruer
*Attorney, Agent, or Firm*—Thomas A. Beck

[57] ABSTRACT

A temporary window which comprises, two sheets, made of a flexible transparent film, cut to a pre-selected pattern corresponding to a shape adapted to cover the entire door frame around the opening of a broken window, wherein the two sheets are attached adjacent to one another to form an envelope compatible in dimension with the door structure, so that this temporary window can be used to envelope and seal the area of the broken window without having to use any glue, tape or other messy and sticky adhesives. The two sheets are between 3.5 and 6.5 mils. in thickness to allow for wind noise suppression while maintaining optical clarity.

3 Claims, 1 Drawing Sheet

PLASTIC REPLACEMENT WINDOWS FOR AUTOMOBILES

FIELD OF THE INVENTION

This invention generally relates to a temporary window that can be used to cover and protect the opening left by a missing or broken glass in a window or the like. More specifically, but not by way of limitation, the present invention relates to two sheets, each made of a transparent flexible film, attached together to form an envelope which will fit snugly over the upper half of the door on almost any automobile or the like, so that it will completely envelope the opening left by the broken or missing window.

DESCRIPTION OF THE PRIOR ART

The use of an apparatus employing a sheet of plastic film to temporarily cover the opening or hole produced by a broken or missing window glass or the like is generally known in the prior art but all such apparatus have various limiting features which neither detract from the novelty of the presently disclosed device, nor make it obvious. Generally, the plastic film will be tied or taped to the window or other structure surrounding the opening such as to temporarily cover the opening until permanently repaired with replacement glass. Such a device is both messy, and very inconvenient to install. It may require considerable effort to clean up the residue remaining after its use because all the known prior art include some type of glue, tape or other adhesive which is messy and hard to remove from both the body of the vehicle and the user's hands. When the broken glass is an automobile window, additional concerns and problems are encountered. For example, unless the film is transparent, visibility during driving will be impaired. If the film is loosely installed or of incorrect thickness, the sound produced during driving may be annoying, if not distracting or deafening, to the driver increasing the risk of an accident during operation of the vehicle, The ability to seal the film reliably, such as to produce a good moisture or rain barrier, can be difficult if not impossible using the existing art. Furthermore, the existing art does not adequately prevent the migration of remaining glass fragments into the car's interior.

In view of these problems associated with the prior art, the need is clear for an inexpensive, functional and reliable temporary window system, particularly for broken automobile side windows in the window frame or the like and same is herein disclosed. The present invention is viewed as filling these needs and other voids left by the existing art.

A prior art search, revealed two patents dealing with replacement windows to wit,: U.S. Pat. No. 3,411,562 and U.S. Pat. No. 4,889,754. Neither patent anticipates nor discloses the presently disclosed structure, which is of an envelope structure held in place by the structural components of the door itself and further secured, if necessary, by ties pulled through holes at the outer bottom of the interior and/or exterior of the replacement window. Said ties may be tied to the interior or exterior handles of a car door or other structure on which the replacement window is deployed. U.S. Pat. No. 3,411,562 shows a temporary windshield for a motor vehicle. Referring to claim 1, it will be seen that the windshield is of an "elongated sheet of flexible transparent plastic material" and includes a "plurality of transversely extending reinforcing rods, located in closely spaced apart parallel relationship". The windscreen is held in place by shutting the doors of the vehicle on either end. Accordingly, the only similarity between the presently disclosed apparatus and the device shown in U.S. Pat. No. 3,411,562 is that the doors of the vehicle are used to secure the replacement window. However, the presently disclosed device can be secured by simply closing only the door on which it is being used Moreover, the structure of the presently disclosed invention is significantly different so as to not be anticipated by U.S. Pat. No. 3,411,562.

U.S. Pat. No. 4,889,754 is a temporary window. This device uses flexible film but must be held in place with an adhesive which can be messy, anti inconvenient to install and which may require considerable effort to remove after use. Furthermore, a significant and legitimate question is raised by this method of attachment as to how long the device can remain in place when the car is actually driven.

SUMMARY OF THE INVENTION

The temporary window according to the present invention comprises two sheets of transparent polymeric film attached to each other by a plastic melt or staples, or otherwise forming a two-layered transparent composite envelope. The two sheets of transparent polymeric film can be cut or pulled open along a series of pre-selected lines such that this temporary window envelope can be opened along its pre-selected contours, making it adaptable to doors of various dimensions. The overall shape and geometry of the two-sheeted, composite, temporary window envelope are calculated to be able to envelop the entire upper portion of the door frame surrounding the broken window. The structure of the present invention also prevents the remaining fragments of window glass from falling into the car from the door frame.

The novelty of this temporary window is that it can be effectively used to envelop and seal the area of the broken window without having to use any glue, tape or other messy and sticky adhesives, which may in any event form an inadequate or imperfect seal. Furthermore, the presence of such an adhesive could cause clouding of the plastic or other visibility problems should same contact the transparent portions of the plastic through which the user intends to look.

OBJECTS OF THE INVENTION

It is, therefore, the principal object of the present invention to provide a transparent temporary window that can be easily and readily used to cover and protect the hole or opening of a broken glass window, and particularly a broken automobile window.

Another object of the present invention is to provide a temporary window that is sufficiently strong to withstand the air forces and wind associated with a moving automobile, without itself generating excessive and distracting noise during such use.

Yet another object of the present invention is to provide a temporary window which allows for external wind noise suppression while maintaining optical clarity.

Still a further object of the present invention is to provide the above in a convenient and relatively inexpensive manner, as well as to prevent fragments of glass remaining in the door frame from migrating to the interior of the vehicle.

Other objects, advantages and novel features of the invention will become readily apparent to those skilled in the art from the following detailed description of the invention when considered in conjunction with the attached drawing wherein like reference numbers identify like parts throughout.

DETAILED DESCRIPTION OF THE INVENTION

The associated advantages of using the temporary window 10, according to the present invention, can perhaps be best explained and understood by reference to the drawings. Referring now more specifically to the preferred embodiment shown in FIG. 1 there is disclosed a temporary window 10 comprising two sheets of a flexible transparent film 11 forming an envelope which will fit snugly over the upper half of the door on almost any automobile or the like such that it will completely envelop the broken or shattered window.

Figure 1:
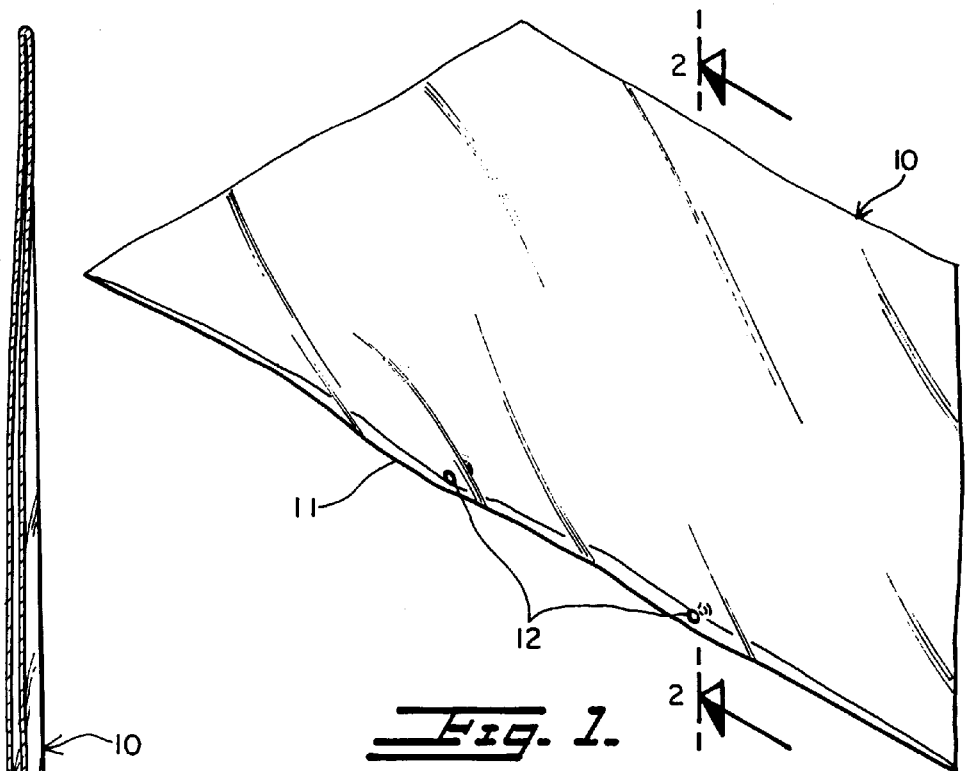
FIG. 1 illustrates a typical temporary window with pre-selected pattern corresponding to its use on any given automobile side door window when the transparent envelope is laid over the door frame of the automobile.
Figures 2, 3:
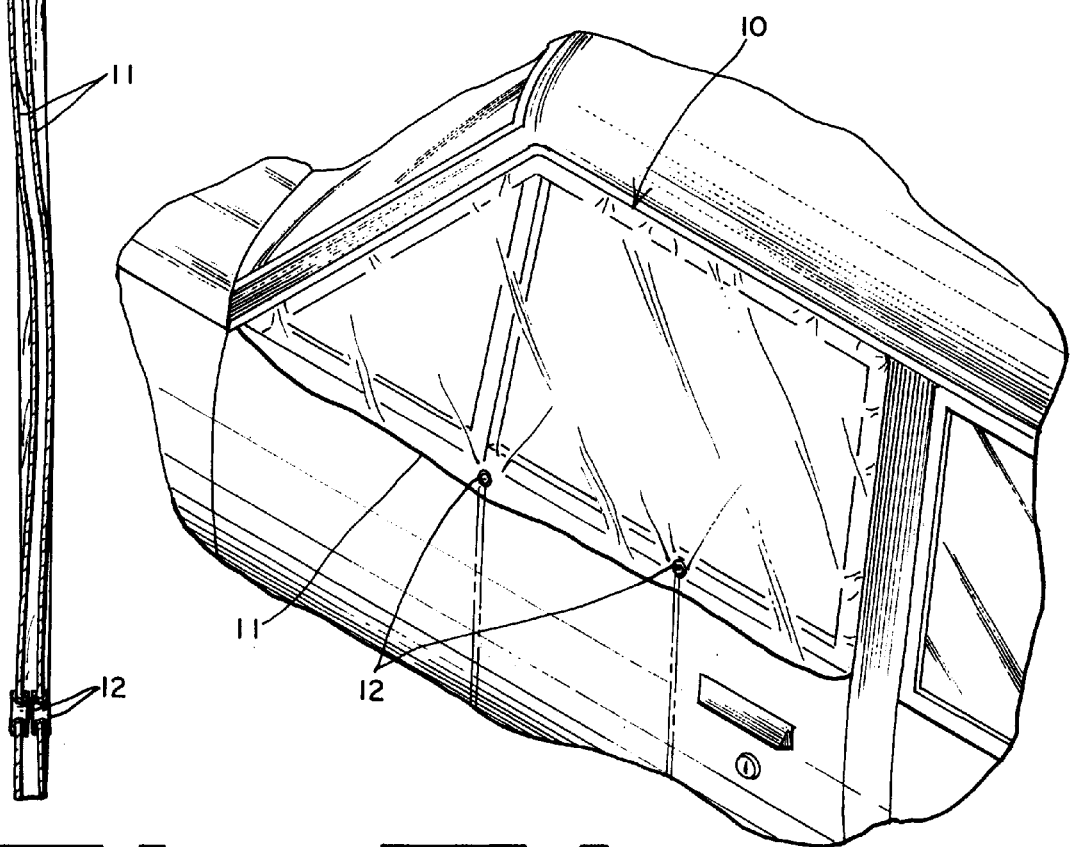
FIG. 2 is an enlarged cross-sectional view of the transparent temporary window of FIG. 1 illustrating the 2 typical sheets and precut perforations or markings.
FIG. 3 illustrates the typical installation of the transparent temporary window envelope on an automobile.

FIG. 1 discloses a preferred embodiment of a temporary window according to the present invention prior to installation. As illustrated in the drawing, the temporary window 10 is preferably made of two sheets of transparent film designated by the numeral 11. Each sheet 11 is made of a relatively thick transparent film of flexible polymeric material.

The exact overall cut and size of the two sheets of a flexible transparent film 11 is such that they will cover and extend around the entire door frame of the automobile. The front edge of the temporary window 10 can thus be trimmed 6> or folded around the entire door frame. In this manner, the temporary window 10 will be around the window frame sealing the entire opening of the window.

It should be understood that the exact dimensions of the temporary window 10 vary depending on the specific automobile or door frame involved. Thus, the overall shape and size of the window can vary: for example, notches 12 can be provided at the lower corners to accommodate windows of various sizes. Exactly how the temporary window 10 is installed is the same because once a pattern is cut for a particular vehicle, the temporary window 10 will slip over the door frame of said vehicle and fit snugly in place without the use of any glue, adhesive, or other sticky substance.

The two sheets of transparent film 11 are cut preferably out of 4.5–6.5 mil. polyester or bi-axially oriented polypropylene. For the preferred automobile window application, such thickness will result in the suppression of wind noise during use which continues to improve up to about 10 mil. total thickness.

The manufacture of the two sheets 11 of the temporary window 10, according to the present invention, can be by various methods that are generally known in the art to fabricate laminated polymer film, and the like. Means for cutting the pre-selected pattern or shape of the two sheets of transparent film 11, which are combined to make the temporary window 10, are generally known in the art.

The two sheets 11 of the present invention can be made of any plastic film which will exhibit wind noise suppression yet maintain its tensile strength and optical clarity. In a preferred embodiment, the two sheets of transparent film 11 are to be selected from the group consisting of, transparent grades of polyolefins such as polyethylene and/or polypropylene; polyesters such as transparent film grade polyethylene terephthalate and related copolymers; and acrylics such as film grade polymethylmethacrylate and related copolymers and film based on or containing polystyrene.

The advantages and benefits of the present invention are many. For example, the temporary window 10 according to the present invention is relatively inexpensive and highly versatile in that it can be readily applied to various sizes and shapes of broken windows particularly in automotive doors. The precut temporary window envelope facilitates the use of the temporary window 10. The two sheets are between 3.5 and 6.5 mils. In thickness to allow for wind noise suppression while maintaining optical clarity.

While a particular use for this apparatus is disclosed for a standard automobile the invention disclosed herein is intended to be used in any other motor-vehicle door or standard door that may have a broken, shattered, or damaged window.

Since the invention is described and illustrated with reference to but a single, preferred embodiment, and since numerous modifications and changes will become readily apparent to those skilled in the art after reading this disclosure, it should be understood that we do not wish to limit the scope of our invention to the exact construction shown and described above, and as claimed by us below.

We claim:

1. A temporary replacement window comprising:

two sheets of a flexible transparent film pre-cut to a pattern that is shaped to snugly fit over a broken window frame on an automobile or motor vehicle;

and means of attaching the two sheets of a flexible transparent film, along a portion of their edges, so that together the two sheets form an envelope which will fit snugly over the frame of a vehicle door having the broken window.

2. A temporary replacement window of claim 1 wherein the means of attaching the two sheets are staples, adhesives, heat sealing, sonic sealing, and mechanical sealing.

3. A temporary replacement window of claim 2 wherein both sheets are between 3.5 and about 6.5 mils. in thickness to allow for wind noise suppression together with tensile strength and optical clarity.

* * * * *